United States Patent

Gambrill

[11] Patent Number: 5,427,450
[45] Date of Patent: Jun. 27, 1995

[54] APPARATUS AND METHOD FOR IN-PLACE CLEANING OF A MIXER

[75] Inventor: Jeffrey S. Gambrill, Hilton, N.Y.

[73] Assignee: General Signal Corporation, Stamford, Conn.

[21] Appl. No.: 314,184

[22] Filed: Sep. 28, 1994

Related U.S. Application Data

[63] Continuation-in-part of Ser. No. 24,715, Mar. 1, 1993, Pat. No. 5,368,390.

[51] Int. Cl.6 ................ B01F 13/08; B01F 15/02
[52] U.S. Cl. .................. 366/168.1; 366/273; 366/331
[58] Field of Search ............. 366/273, 274, 245, 247, 366/249, 251, 279, 150, 155, 156, 167, 168, 331; 277/16, 47, 50

[56] References Cited

U.S. PATENT DOCUMENTS

| | | |
|---|---|---|
| 2,300,385 | 10/1942 | Kollberg . |
| 2,556,854 | 6/1951 | Spears . |
| 2,892,620 | 6/1959 | Johnston ............... 366/273 |
| 2,963,306 | 12/1960 | Tracy ................... 277/16 |
| 3,342,460 | 9/1967 | Bolde ................... 366/251 |
| 3,606,260 | 9/1971 | Rubin . |
| 3,642,291 | 2/1972 | Zeffer . |
| 3,933,358 | 7/1976 | Huer . |
| 4,132,666 | 1/1979 | Shinichi ............... 366/249 |
| 4,184,090 | 1/1980 | Taiani . |
| 4,209,259 | 6/1980 | Rains . |
| 4,252,332 | 2/1981 | Nokajama . |
| 4,565,453 | 1/1986 | Jekat . |
| 4,721,003 | 1/1988 | Hutching . |
| 4,747,604 | 5/1988 | Nakamura . |
| 4,752,194 | 6/1988 | Wienen . |
| 4,753,534 | 6/1988 | Markle ................. 366/279 |
| 4,775,291 | 10/1988 | Culbertson . |
| 4,813,786 | 3/1989 | Lemaster ............... 366/251 |
| 4,854,823 | 8/1989 | Hatting . |
| 4,878,677 | 11/1989 | Larkins . |
| 4,955,724 | 9/1990 | Otto . |
| 4,998,863 | 3/1991 | Klaus . |
| 5,017,102 | 5/1991 | Shimaguchi . |
| 5,066,200 | 11/1991 | Ooka . |
| 5,094,542 | 3/1992 | Engel . |
| 5,108,715 | 4/1992 | Jakat . |
| 5,203,574 | 4/1993 | Stolzenfeld . |

Primary Examiner—Robert W. Jenkins
Attorney, Agent, or Firm—M. Lukacher; R. Hubbard

[57] ABSTRACT

An in-place flush-cleanable mixer system for mixing materials in a vessel. The mixer has an impeller connected to a mixer drive shaft, the impeller and shaft being mounted in an assembly which extends through an opening into the vessel and closes that opening. The assembly has a cylindrical hub with bearings which support the shaft and with an open passageway through which the shaft extends out of an open end of the hub. The open passageway is part of a confinement region which is terminated at its outer end by a confinement shell which separates inner and outer rotors of a magnet coupling. The inner rotor is connected to the mixer shaft, and the outer rotor is connected to a drive shaft. There are no dynamic seals which close the confinement region so that the working materials can be present throughout. Included in the assembly is a purge plate coaxially disposed and fitted with a closable port for introduction of flush cleaning materials and with an annular manifold and passages for distribution of the cleaning materials to the open passageway. Abutting assembly components have annular grooves at a periphery of their abutting faces and O-rings disposed and compressed within the grooves to prevent working or cleaning materials from entering the joints between the components and to provide easily flush-cleanable working surfaces at the joints. Bolts and screws within the confinement region are relieved at the periphery of the undersides of their heads and therein have O-rings compressibly retained to prevent entry of materials under the heads.

16 Claims, 2 Drawing Sheets

APPARATUS AND METHOD FOR IN-PLACE CLEANING OF A MIXER

DESCRIPTION

This is a continuation-in-part of my application, Ser. No. 08/024,715, filed Mar. 1, 1993 and allowed Jul. 6, 1994, now U.S. Pat. No. 5,368,390, issued Nov. 29, 1994 which is hereby incorporated by reference.

The present invention relates to mixer systems, by which is meant systems for suspending, agitating and/or circulating materials, particularly liquids or liquid suspensions, particularly to mixer systems for mixing materials requiring a high degree of purity, such as, for example, dyes, food stuffs, photographic materials, and pharmaceuticals, and more particularly to apparatus and method for in-place flush cleaning of mixer systems between batches to achieve extremely clean and substantially sterile working surfaces. By working surfaces is meant the surfaces of mixer system components which come into contact with the materials being mixed during normal operation of the mixer.

Prevention of in-process contamination of materials being mixed (herein referred to as "working materials") in a vessel is a vital concern in many industries. Contamination can be introduced into a mixing process in several ways, one of which is by cross-contamination between successive batches of materials. Another way is by growth of microbial organisms within the vessel. In both cases, the mixing apparatus itself can be an important contributor to contamination if the apparatus retains traces of working materials from previous operations. Scrupulous cleaning of all soiled surfaces of the apparatus is essential to prevent such contamination.

Conventional mixers can provide good mixing of materials but typically require disassembly and off-line cleaning of components between batches to prevent contamination. Off-line cleaning increases production downtime and reduces efficiency. Even if spare suits of equipment are available, additional cost for such suits is incurred and mixing equipment change-over can still take considerable time. Also, disassembly of the mixer from the vessel can itself be an avenue of contamination, since typically the vessel is opened to the outside atmosphere when the mixing apparatus is being removed or replaced. In some mixing processes, this is highly undesirable.

In the above-incorporated parent application, mixing apparatus is disclosed in which all the working surfaces are confined within the vessel environment by means of a static confinement shell between the outer, or drive, rotor and the inner, or driven, rotor of a magnetically-coupled drive system. A novel aspect of that invention is an open passageway in communication between the interior of the vessel and the inner rotor, wherein bearings resistant to the working materials are fully exposed to those materials. There is no resort to rotary shaft seals, as in prior mixers, to shield the bearings from exposure to the working materials. An inflatable static shaft seal, as shown in FIGS. 3 and 5, is provided which can be deployed during batch changes to permit change-over of the upper mixing equipment while maintaining the integrity of the atmosphere in the vessel. A purge plate (Item 62 in FIGS. 4-6) can be included in the mixer assembly to permit flush cleaning or sterilizing of the upper mixing equipment without disassembly by introduction of cleaning material through a passageway including inlet port 152 and exhaust port 154, preferably while the lower mixing equipment below the static seal is being cleaned by procedures for cleaning remotely the vessel walls and internal fittings.

Flush cleaning as disclosed in the parent application is suitable for many mixing needs. However, it is not intended for use in process applications requiring extreme cleanliness or sterilization of all working surfaces between batches of materials. Disassembly of the disclosed mixing apparatus to provide substantially sterile cleaning is still required. The open passageway disclosed above can include several mixer components which are connected, as, for example, by bolts. The joints between such parts having working surfaces can collect and trap some of the working material, which material can be extremely difficult to remove by subsequent flush cleaning. This material, however, can leach out of the joints in succeeding operations and cause unacceptable contamination of succeeding batches. In processes susceptible to biological growth and contamination, as for example, in the mixing of dairy products such as milks or in wine-making or other fermentation processes such as in the manufacture of pharmaceuticals, unwanted microorganisms can become established and multiply in these joints, eventually causing unacceptable contamination of the materials being mixed.

Conventional technology suggests to use O-rings in grooves on the abutting faces of these parts to prevent entry of working materials into the joints. However, conventional O-ring grooves are located at some distance along the abutting faces from the working surfaces of the parts, resulting in joints which still can collect traces of material outboard of the O-rings.

It is a principal object of the invention to provide an improved mixing system wherein working surfaces can be cleaned without disassembly of the system.

It is a still further object of the invention to provide an improved mixing system for a vessel wherein abutting surfaces between connected parts are prevented from contact with the working materials.

It is a further object of the invention to provide an improved mixing system for a vessel wherein the working surfaces can be cleaned in place by flushing with one or more cleaning materials from outside the system into the vessel.

It is a still further object of the invention to provide an improved mixing system for a vessel wherein batch changes can be made without cross-contamination between batches and without violating the integrity of the atmosphere within the vessel.

It is a still further object of the invention to provide an improved method for cleaning and substantially sterilizing the working surfaces of mixing apparatus in a vessel without disassembly of the apparatus.

Briefly described, a mixer system embodying the invention is applicable for mixing material in a vessel having an opening. A mixer shaft for rotatably supporting a mixing impeller is used. The mixer shaft is rotatably supported in bearings contained in an assembly which is located in the opening and closes the opening to confine the material in the vessel and to prevent contamination of the material from outside the vessel. The assembly has a hub having an open passageway in which the bearings, shaft, and an inner magnetically-coupled driven rotor on the shaft are disposed. Since the passageway is open the mixer system is sealless. The passageway connects the bearings, shaft, and inner rotor and the vessel in communicating relationship for the material. There are no dynamic shaft or bearing seals in the passageway. The bearings and all other working surfaces have at least the surfaces thereof exposed to the process materials being mixed, which surfaces are made of material resistant to the process materials. The bearings may be mounted in a cartridge which is removably disposed in the assembly.

The passageway communicates with a port in the mixer assembly. This port is normally closed but can be opened to admit flushing and cleaning materials when desired. The passageway is so constructed that the flushing and cleaning materials are ducted at high velocity over all the upper mixer working surfaces sequentially and are then discharged through the bearing retainer at the open end of the hub into the vessel. Parts of the passageway are constricted or of small diameter to provide high velocity and high turbulence of the cleaning materials while maintaining high flow volume. Preferably, all working surfaces in the passageway are provided with a highly polished finish to facilitate flush cleaning of the surfaces.

Abutting mixer components having working surfaces in contact with the working materials are provided with annular grooves at the periphery of their abutting faces, which grooves are fitted with elastomer rings ("O-rings") during assembly of the mixer components. The cross-section of the rings is preferably non-circular. The elastomer rings provide a flush-cleanable working surface at the joint between the components and seal the joint over the entire abutting faces from entry by the working materials or the cleaning materials.

Threaded fasteners such as nuts, bolts, and screws in the confinement region of conventional mixers can trap potential contaminants under their heads. In accordance with the invention, the heads of all such threaded fasteners are relieved on the underside at the periphery and an O-ring is disposed in the relief and compressed during assembly of the mixer, providing a tight seal against entry of materials to the joint between the fastener and the component it secures.

The foregoing and other objects, features, and advantages of the invention, as well as presently preferred embodiments thereof, will become more apparent from a reading of the following description in connection with the accompanying drawings in which.

Figure 1:
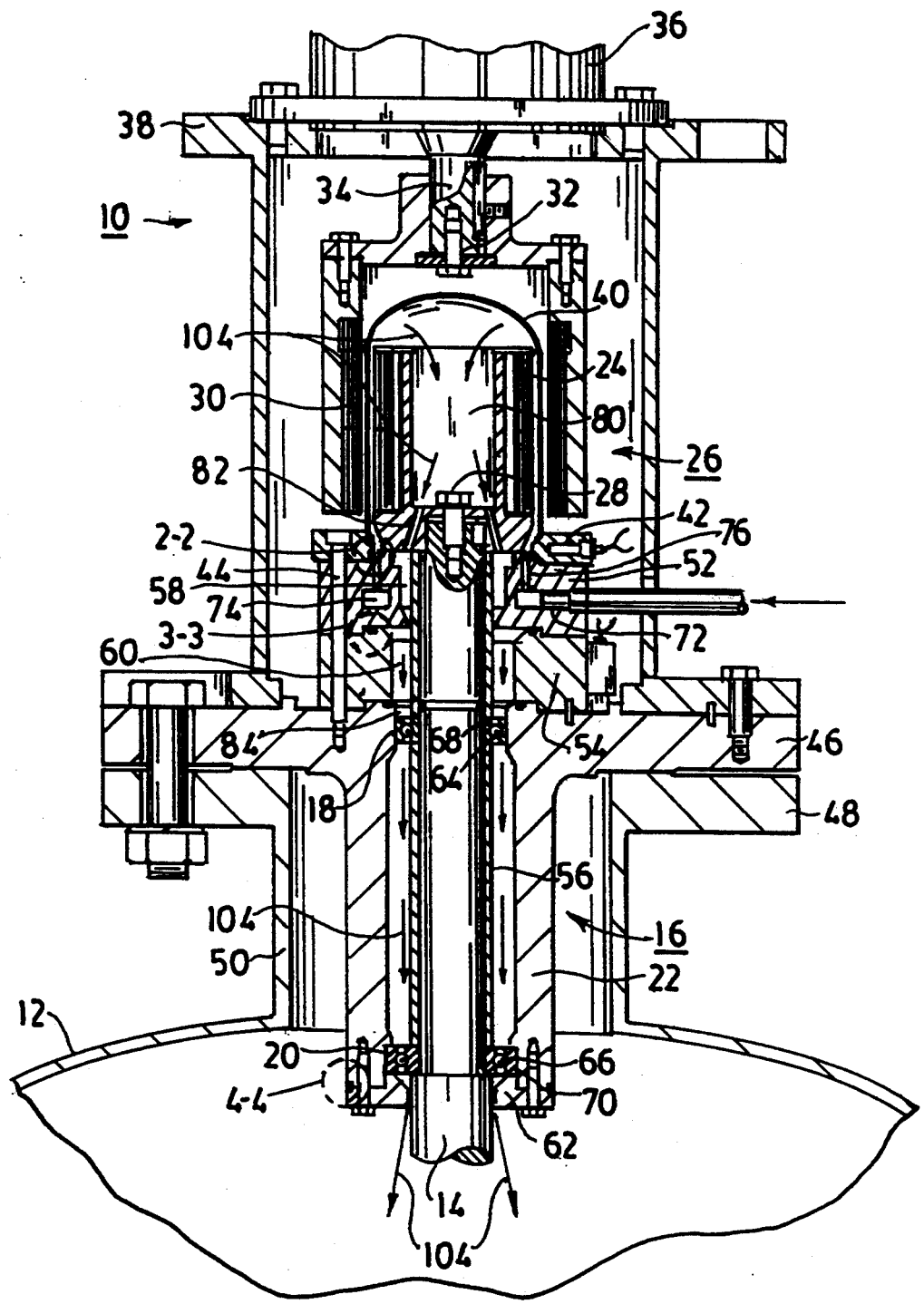
FIG. 1 is an elevational view, partially in section, of a portion of a mixer system embodying the invention.

Referring to FIG. 1, there is shown a top-entry sealless mixer system 10 which embodies the invention. Material to be mixed is introduced into a vessel 12. An impeller (not shown) is located in vessel 12 (only partially shown) and is connected to mixer shaft 14. An assembly 16 has upper and lower bearings 18 and 20, respectively, disposed coaxially in hub 22 which bearings rotatably support the shaft and also rotatably support an inner rotor 24 of a magnetic coupling 26 disposed coaxially on shaft 14. Rotor support is provided by a cap nut 28 which is disposed on the shaft 14 for torque transmission between inner rotor 24 and shaft 14.

The outer rotor 30 of the coupling 26 is connected via the flanged end 32 of a drive shaft 34 which extends from a motor gear-box assembly 36. The motor gearbox assembly is mounted in known fashion on support 38. Magnetic coupling 26 has circumferentially disposed arrays of permanent magnets in its inner and outer rotors 24 and 30, respectively. The magnets in the inner rotor 24 are aligned with the magnets in the outer rotor 30 but are polarized oppositely. The magnetic coupling has a confinement shell 40 (also known as a separator, separating member, or containment shell) having a flange 42 which is bolted in the assembly by bolts 44. The shell contains the working and cleaning materials within the vessel 12, to which materials the inner rotor 24 is fully exposed. The design of the coupling 26 may be conventional and it may be of the type which is commercially available.

The assembly 16 has a flange 46 which may be welded to hub 22. The assembly flange 46 is bolted to a flange 48 of the nozzle 50 of the vessel 12 and closes the opening into the vessel with the assembly 16. The assembly also includes a purge plate 52 and optionally a spacer plate 54. These plates, either when used alone or in combination, are held in the assembly by bolts 44.

The cylindrical hub 22 has an internal bore or passageway 56 which defines a passageway through which the mixer shaft 14 extends and in which the shaft bearings 18 and 20 are disposed. This passageway 56 is open to the vessel 12 and therefore to the working materials confined therein which, especially if the vessel is pressurized, are present in the passageway 56. The passageway 56 is part of a confinement region which includes cylindrical bores 58 and 60 in the plates 52 and 54, respectively, and the inside of confinement shell 40. The hub 22 is terminated at its open end by a bearing retainer 62 but is otherwise open and in any case is sealless. The working surfaces of all mixer components are finished to a high polish, for example, 10 RA. Mixer components are made of corrosion-resistant materials such as plastic or preferably metals, such as, for example, 316L stainless steel.

The bearings 18 and 20 are bearings having rolling elements, namely balls 64 and 66 and inner and outer races 68 and 70, respectively. The balls 64 and 66 of the ball bearings and the races thereof are all exposed to the working materials within the vessel. The bearing surfaces which are exposed are made of material resistant to the working materials. Desirably the balls are made entirely of such material so that their surfaces are resistant. The balls may be ceramic, for example, silicon nitride. An alternative material which may be suitable for other applications is stellite, which is a boron-containing alloy. Preferably, the bearing races are finished on their axial surfaces to a flatness variation of less than 0.0005 inch and are pressed into position such that the mating joints with the hub and the mixer shaft are virtually dimensionless and are negligible potential sources of residual contamination, as demonstrated by the example described hereinbelow.

As shown in FIG. 1, the purge plate 52 has a closable port 72, an annular manifold 74, and a plurality of circumferentially disposed openings 76 communicating between annular manifold 74 and confinement shell 40. In a preferred embodiment there are six such openings 76, each about 4 mm in diameter. Inner rotor 24 is disposed on shaft 14 such that there is a clearance 78 of preferably only a few thousandths of an inch between the inner rotor and purge plate 52 at the outer edge of the rotor. A bore 80 within rotor 24 communicates via a plurality of circumferentially disposed openings 82, preferably four of 8 mm diameter each. Hub 22 has a bore 84 therethrough in which shaft 14 is disposed and is preferably spaced about 0.5 mm from the shaft 14.

This system of openings and bores functions as a continuous, open passageway for flushing and cleaning working materials from the working surfaces of the mixer assembly into the vessel. Flushing and cleaning material can be introduced through closable port 72 to clean and purge working material from all of the above passages, to which the working material has full access during operation of the mixer, into the vessel. In some instances, a series of flushes with various cleaning materials, at various temperatures and/or flow rates for various lengths of time, may be required to produce a desired state of cleanliness or sterility. These conditions can be determined experimentally for different working materials and different states of cleanliness. The pressure and volume of liquid flushing and cleaning materials is selected to provide a velocity of those materials at the working surfaces of the mixer components of, preferably, at least 5 feet per second, although in some mixers excellent cleaning can be obtained at significantly lower flush velocities for example in the range of one to seven feet per second. Liquid flushing and cleaning materials can include inorganic aqueous solutions, organic aqueous solutions, tap water, deionized water, organic solvents, and dispersions and suspensions of, for example, silica particles, glass beads, or ice chips. Gaseous flushing and cleaning materials or mixtures, for example nitrogen, helium, halogens such as chlorine or bromine, oxygen, or air, can also be used to clean mixers in accordance with the invention.

Figure 2:
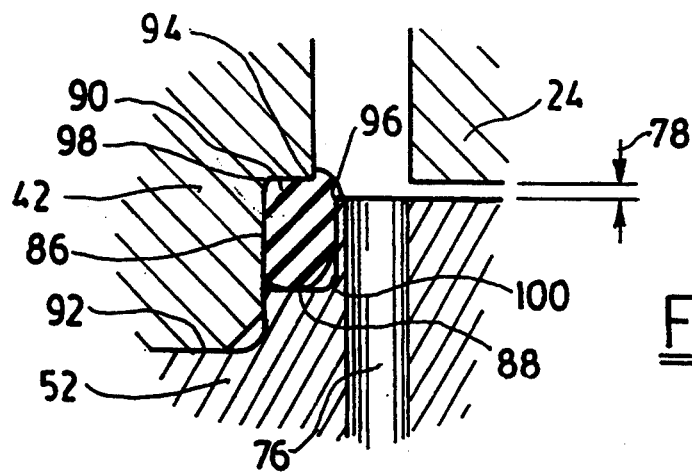
FIG. 2 is an enlargement of area 2—2 in FIG. 1, showing an embodiment of a peripheral O-ring in accordance with the invention.
Figure 3:
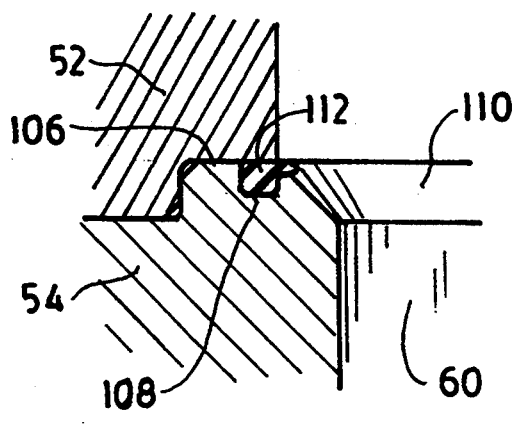
FIG. 3 is an enlargement of area 3—3 in FIG. 1, showing another embodiment of a peripheral O-ring in accordance with the invention.
Figure 4:
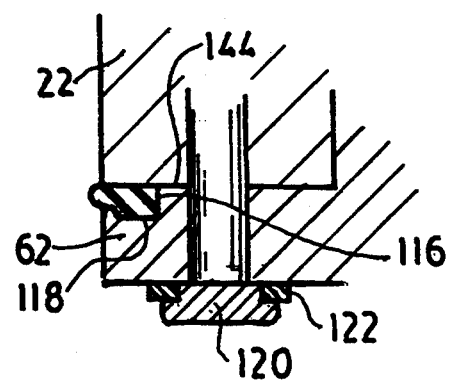
FIG. 4 is an enlargement of area 4—4 in FIG. 1, showing two further embodiments of peripheral O-rings in accordance with the invention.

In FIGS. 2, 3, and 4 are shown embodiments of an important aspect of the instant invention. As noted above, various of the mixer components are formed separately and bolted together, having joints therebetween. FIG. 2 shows an enlarged view of the meeting of the inner periphery of the flange 42 of confinement shell 40 with purge plate 52. Both flange 42 and plate 52 have opposed annular grooves 86 and 88 at the contact point of the respective working surfaces (which would be exposed to the working materials in previous designs), and captured therein is a specially-designed annular elastomer ring or O-ring 90. Metal-to-metal contact between the abutting parts occurs at joint 92. However, the O-ring 90, which is disposed at the extreme inner edge or periphery of the joint 92 and is compressed to the cross-sectional shape shown in FIG. 2 during assembly of the mixer components, serves to prevent working materials from entering joint 92. Furthermore, by virtue of its shape, which is circular when uncompressed but preferable are generally similar to the shape in cross-section (but larger) of the annular cavity formed by the grooves 86 & 88, peripheral O-ring 90 covers the entry to the joint adjacent to both parts 42 and 52, and provides a smooth, curved surface from which working materials can be easily flush cleaned. In a preferred embodiment, the entries 94 and 96 are rounded at a radius of about 0.005 inches, the inner corners of annular grooves 98 and 100 respectively are each rounded at a radius of between about 0.010 and 0.025 inches, and in assembled position as shown in FIG. 2 the annular cavity containing the O-ring is about 0.150 inches axially and about 0.112 inches in the radial direction. The peripheral O-ring is preferably of viton or EPDM, both commonly-available corrosion-resistant elastomers.

The O-ring may preferably be of the same shape, but a few thousandths of an inch larger in cross-sectional dimensions than the assembled annular cavity, whereby the O-ring during assembly becomes deformed and slightly protruded from the annular cavity and forms a very tight seal against the abutting components. If an O-ring of circular cross-section is used it is preferably a few thousandths of an inch larger in diameter than the distance between the horizontal surfaces of grooves 86 & 88.

FIG. 2 also shows the relationship of the inner rotor 24 to the purge plate 52 and to flange 42. Flushing material enters the confinement shell through openings 76. Rotor 24 is disposed a short distance 102 from purge plate 52, preferably only a few thousandths of an inch, so that the flushing material preferentially flows around and cleans the outside of rotor 24 and the inner surface of confinement shell 40 before flowing through and cleaning bore 80 inside of rotor 24 and openings 82. Flushing material then flows around shaft 14 through bores 58 and 60, along passageway 56, and discharges into vessel 12 through the annulus between shaft 14 and bearing retainer 62, as shown by arrows 104 in FIG. 1

FIG. 3 shows another embodiment of a peripheral O-ring seal in accordance with the invention. At the inner periphery of the joint 106 between purge plate 52 and spacer plate 54, an annular groove 108 is provided in spacer plate 54 which extends radially into the tapered entry 110 to spacer plate bore 60. No opposed groove is needed in purge plate 52. A specially-designed O-ring 112 substantially L-shaped in cross-section compressibly fills groove 108 thereby preventing working material from entering joint 106 and providing a readily flush-cleanable working surface. However, a circular cross-section O-ring may be used which is sufficiently large to fill and be extruded from the cavity formed by the groove 108 at the joint 106.

FIG. 4 shows still another embodiment of a peripheral O-ring seal in accordance with the invention. At the outer periphery of the joint 114 between hub 22 and bearing retainer 62, an annular groove 116 is provided in bearing retainer 62. No opposed groove is needed in hub 22. A specially designed O-ring 118 generally rectangular in cross-section with a lobe on its outer periphery compressibly fills groove 116 during assembly of the mixer, the lobe protruding slightly from the joint 114, providing a readily flush-cleanable working surface at joint 114 and preventing working material from entering the joint.

Another aspect of the instant invention is also shown in FIG. 4. Joints are present under the heads of nuts, bolts, or other threaded fasteners such as screws in contact with the working materials, as, for example, under the heads of bolts 44, bolts 120, and nut 28. In a preferred embodiment in accordance with the invention, the periphery of the under-surface of each fastener head is relieved and a washer-shaped O-ring 122 is installed in the peripheral relief during assembly of the mixer, the O-ring being over-compressed and protruding slightly from the joint, as shown in FIGS. 1 and 4. The head still makes metal-to-metal contact inboard of the O-ring, but working material is prevented from entering and being retained in the joint and a smooth, readily flush-cleanable working surface is provided at the joint.

EXAMPLE

A magnetically-driven sealless mixer in accordance with the invention was intentionally contaminated with outdated milk. Milk was pumped through the closable port and the open passageway of the mixer for 5 seconds at a flow rate of 3 gallons per minute. Milk samples for testing were taken at the entry to the mixer. Tap water was then run through the same path for 15 seconds at a water flow rate of about 3 GPM to remove gross residue, followed by a detergent wash for 15 seconds at 3 GPM to remove any fat from the working surfaces, followed by a tap water rinse for 15 seconds at 3 GPM. Steam was then passed through the mixer for 5 minutes, followed by phosphate buffered deionized (DI) water for five seconds. Samples of DI water were collected in sterilized containers. Aerobic plate counts were performed on the outdated milk to determine the uncleaned level of contamination in the mixer assembly. Counts were done on a deionized water sample from the entrance to the mixer to determine the background level of micro-organisms in the flushing water. Counts were performed on flushing water after passage through the mixer to determine the level of residual microorganisms in the mixer.

Tests of ten different spoiled milks were performed using two different detergents, Detergent A being an ammonia-containing detergent and Detergent B being a liquid chlorinated detergent. Residual bacterial counts were made per 100 ml and per 1 ml of deionized water. All samples were analyzed according to the Food and Drug Administration's Bacterial Analytical Manual, 7th Edition, Chapter 3 (Aerobic Plate Count), and the Compendium of Methods for the Microbial Examination of Foods, 3rd Edition, Chapter 4 (Colony Count Methods). The comparative results are as follows:

| Trial No. | Milk inoculum count per ml. | Aerobic plate count per 100 ml of DI rinse | Aerobic plate count per 1 ml of DI rinse |
|---|---|---|---|
| With Detergent A (Deionized water count before entering mixer: 9/ml) | | | |
| 1 | 62,000,000 | 2 | <1 |
| 2 | 120,000,000 | 11 | <1 |
| 3 | 62,000,000 | <1 | <1 |
| 4 | 280,000 | 1 | <1 |
| 5 | 1,600,000 | <1 | <1 |
| With Detergent B (Deionized water count before entering mixer: 1/ml) | | | |
| 6 | 380,000,000 | 220 | 4 |
| 7 | 26,000,000 | 230 | 2 |
| 8 | 470,000,000 | <1 | <1 |
| 9 | 700,000,000 | 4 | <1 |
| 10 | 16,000,000 | 21 | <1 |

The tests show that a carefully-designed flush cleaning protocol can remove an extremely high percentage of working material residues from a mixer in accordance with the invention, resulting in extreme cleanliness and practical sterility of the working surfaces without disassembly of the mixer.

From the foregoing description it will be apparent that there has been provided improved mixer systems, and especially systems using magnetic couplings and sealless entry into a vessel in which mixing occurs, wherein the working surfaces of the mixer can be flush cleaned in place to a very high tolerance. Variations and modifications of the herein described mixer systems, in accordance with the invention, will undoubtedly suggest themselves to those skilled in this art. Accordingly, the foregoing description should be taken as illustrative and not in a limiting sense.

What is claimed is:

1. A mixer system for mixing, agitating, suspending or circulating working materials in a closable vessel, which system can be flush-cleaned without disassembly, comprising:
    a) a mixing shaft;
    b) a plurality of components including bearings supporting said mixing shaft and a hub supporting said bearings, said components being assemblable to provide a mixer assembly having a confinement region open to said vessel, said components having working surfaces and one or more abutting faces thereon, and having joints therebetween at abutting of assembled said components at said abutting faces;
    c) an open passageway in said containment region for communication among said working surfaces of said mixer components and with the interior of said vessel;
    d) an O-ring disposed in an annular groove at a first periphery of at least one of said abutting faces between said abutting components and forming a seal at said first periphery to prevent said working materials from entering said joints; and
    e) a closable first passage in said mixer assembly between said open passageway and the exterior of said mixer assembly to admit cleaning materials to said open passageway.

2. A mixer system in accordance with claim 1 further comprising threaded fasteners for assembling said components, at least one of said threaded fasteners having a head in contact with one of said components to form a joint, said head having an annular relief on a second periphery of the underside thereof and an O-ring disposed within said peripheral relief to form a seal at said second periphery between said threaded fastener head and one of said components.

3. A mixer system in accordance with claim 2 further comprising drive means for said mixer system including a magnetic-coupled drive comprising an outer rotor outside of said confinement region and an inner rotor disposed on said mixer shaft within said confinement region and magnetically coupled with and responsive to said outer rotor.

4. A mixer system in accordance with claim 3 further comprising a confinement shell between said outer rotor and said inner rotor.

5. A mixer system in accordance with claim 4 further comprising a purge plate disposed in said mixer assembly and having an annular manifold therein, which manifold is in communication with said exterior of said mixer assembly via said closable first passage and with said open passageway via one or more second passages.

6. A mixer system in accordance with claim 5 wherein said working surfaces have a surface finish of about 12 RA.

7. A mixer system in accordance with claim 1 wherein said cleaning materials are selected from a list including inorganic aqueous solutions, organic aqueous solutions, tap water, deionized water, distilled water, organic solvents, steam, ammonia-containing detergent, liquid chlorinated detergent, dispersions, suspensions, nitrogen, helium, halogens, oxygen, and air.

8. The system according to claim 1 wherein said groove is at least in part generally non-circular in cross-section.

9. The system according to claim 8 wherein said groove has a generally rectangular shape in cross-section.

10. The system according to claim 8 wherein said groove is of generally "L" shape in cross-section.

11. The system according to claim 8 wherein said O-ring is generally of said cross-sectional shape, but sufficiently larger to fill and be extended from said groove.

12. In a mixer system for mixing, agitating, suspending or circulating working materials in a closable vessel, said mixer system comprising a mixing shaft, a plurality of components including bearings supporting said mixing shaft and a hub supporting said bearings, said components being assemblable to provide a mixer assembly having a confinement region open to said vessel, said components having working surfaces and one or more abutting faces thereon, and abutting of assembled said components at said abutting faces having joints therebetween, the method for flush cleaning in place said working surfaces comprising the steps of:
   a) providing an open passageway in said confinement region for communication among said working surfaces of said mixer components and with the interior of said vessel;
   b) providing an O-ring disposed in an annular groove at a first periphery of at least one of said abutting faces between said abutting components and forming a seal at said first periphery to prevent said working materials from entering said joints;
   c) providing a closable passage in said mixer assembly between said open passageway and the exterior of said mixer assembly to admit cleaning materials to said open passageway;
   d) opening said closable passage in said mixer assembly;
   e) admitting one or more cleaning materials through said closable passage;
   f) passing said cleaning materials through said open passageway and in contact with said working surfaces for a time sufficient to clean said surfaces; and
   g) discharging said cleaning materials from said open passageway.

13. The method for flush cleaning in accordance with claim 12 further comprising the step of providing threaded fasteners for assembling said components, at least one of said threaded fasteners having a head in contact with one of said components to form a joint, said head having an annular relief on a second periphery of the underside thereof and an O-ring disposed within said peripheral relief to form a seal at said second periphery between said threaded fastener head and one of said components.

14. The method for flush cleaning in accordance with claim 12 wherein said passing of cleaning materials through said open passageway is at a velocity of at least one foot per second.

15. The method for flush cleaning in accordance with claim 12 wherein said discharging of said cleaning materials from said open passageway is into said vessel.

16. The method for flush cleaning in accordance with claim 12 further comprising the step of selecting said cleaning materials from the list including inorganic aqueous solutions, organic aqueous solutions, tap water, deionized water, distilled water, organic solvents, steam, ammonia-containing detergent, liquid chlorinated detergent, dispersions, suspensions, nitrogen, helium, halogens, oxygen, and air.

* * * * *